United States Patent
Lee et al.

(10) Patent No.: US 9,910,804 B2
(45) Date of Patent: Mar. 6, 2018

(54) INPUT/OUTPUT METHOD IN VIRTUAL MACHINE ENVIRONMENTS

(71) Applicant: Samsung Electronics Co., Ltd., Suwon-si (KR)

(72) Inventors: Sang-Geol Lee, Seoul (KR); Hyeon-Sang Eom, Seoul (KR); Heon-Young Yeom, Seoul (KR); Myoung-Won Oh, Seoul (KR)

(73) Assignees: SAMSUNG ELECTRONICS CO., LTD., Samsung-ro, Yeongtong-gu, Suwon-si Gyeonggi-do (KR); SEOUL NATIONAL UNIVERSITY R&DB FOUNDATION, Sillim-dong, Gwanak-gu, Seoul (KR)

( * ) Notice: Subject to any disclaimer, the term of this patent is extended or adjusted under 35 U.S.C. 154(b) by 112 days.

(21) Appl. No.: 14/976,605

(22) Filed: Dec. 21, 2015

(65) Prior Publication Data
US 2016/0179725 A1      Jun. 23, 2016

(30) Foreign Application Priority Data
Dec. 22, 2014   (KR) .................. 10-2014-0185988

(51) Int. Cl.
*G06F 9/455* (2006.01)
*G06F 13/378* (2006.01)
(Continued)

(52) U.S. Cl.
CPC ........ *G06F 13/378* (2013.01); *G06F 9/45545* (2013.01); *G06F 9/45558* (2013.01);
(Continued)

(58) Field of Classification Search
CPC .................................................. G06F 9/45545
See application file for complete search history.

(56) References Cited

U.S. PATENT DOCUMENTS 5,506,975 A    4/1996  Onodera
6,435,737 B1   8/2002  Wise et al.
(Continued)

OTHER PUBLICATIONS

Sironi, M. and Tisato, F., "Capturing Information Flows Inside Android and Qemu Environments," Universita degli Studi di Milano-Bicocca, Dipartimento di Informatica, Sistemistica e Comunicazione, Milano, Italy, Feb. 12, 2013, 13 pages.
(Continued)

*Primary Examiner* — Charlie Sun
(74) *Attorney, Agent, or Firm* — Muir Patent Law, PLLC

(57) ABSTRACT

A input/output method is disclosed for performing communications in a virtual machine (VM) environment between a host operating system (OS) and a guest OS. The input/output method includes performing request polling (RP) on an input/output event generated by a guest OS which is driven by a virtual machine (VM), sending an input/output request to a host OS, on which the VM runs. The input/output method further includes performing response waiting polling (RWP) on an input/output completion message generated by the host OS when the input/output event is detected through the RP, and sending an input/output response to the guest OS when the input/output completion message is detected through the RWP. In the method, the RP and the RWP are performed by multiple threads executed on the VM.

17 Claims, 12 Drawing Sheets

(51) Int. Cl.
*G06F 9/48* (2006.01)
*G06F 13/24* (2006.01)

(52) U.S. Cl.
CPC ............ *G06F 9/4812* (2013.01); *G06F 13/24* (2013.01); *G06F 2009/4557* (2013.01); *G06F 2009/45579* (2013.01)

(56) References Cited

U.S. PATENT DOCUMENTS

| | | | |
|---|---|---|---|
| 6,738,836 | B1 | 5/2004 | Kessler et al. |
| 6,957,219 | B1 | 10/2005 | Lin et al. |
| 7,398,329 | B2 | 7/2008 | Moore et al. |
| 7,934,055 | B2 | 4/2011 | Flynn et al. |
| 8,380,681 | B2 | 2/2013 | Oltean et al. |
| 8,412,904 | B2 | 4/2013 | Flynn et al. |
| 8,539,453 | B2 | 9/2013 | Flemming et al. |
| 8,560,779 | B2 | 10/2013 | Castillo et al. |
| 8,589,655 | B2 | 11/2013 | Colgrove et al. |
| 8,694,994 | B1 | 4/2014 | Vincent et al. |
| 8,700,842 | B2 | 4/2014 | Dinker |
| 2013/0160005 | A1* | 6/2013 | Jung .................. G06F 9/45558 718/1 |
| 2016/0124763 | A1* | 5/2016 | Tsirkin ................ G06F 9/45558 718/1 |
| 2016/0261586 | A1* | 9/2016 | Huang .................. G06T 11/60 |

OTHER PUBLICATIONS

Shin, Dong In et al., "Dynamical Interval Polling and Pipelined Post I/O Processing for Low-Latency Storage Class Memory," HotStorage'13 Proceedings of the 5th USENIX Conference on Hot Topics in Storage and File Systems, USENIX, Berkeley, CA, USA, 5 pages.

Barve, Rakesh et al., "Modeling and optimizing I/O throughput of multiple disks on a bus," in Proceedings of ACM Sigmetrics Joint International Conference on Measurement and Modeling of Computer Systems, Atlanta, GA, USA, ACM Press, May 1999, pp. 83-92.

Ohta, Kazuki et al., "Optimization Techniques at the I/O Forwarding Layer," CLUSTER '10 Proceedings of the 2010 IEEE International Conference on Cluster Computing, IEEE Computer Society Washington, DC, USA, Sep. 9, 2010, pp. 312-321.

Rizzo, Luigi et al., "Speeding Up Packet I/O in Virtual Machines," ANCS '13 Proceedings of the Ninth ACM/IEEE Symposium on Architectures for Networking and Communications Systems, IEEE Press Piscataway, NJ, USA, Oct. 21, 2013. pp. 47-58.

"I/O Buffering and Streaming," Duke University Systems and Architecture, available at https://users.cs.duke.edu/~chase/cps210-archive/slides/buf6.pdf, retrieved Dec. 21, 2015, 23 pages.

Marazakis, Manolis, "I/O in Linux Hypervisors and Virtual Machines Lecture for the Embedded Systems Course," CSD, University of Crete, Institute of Computer Science, Foundation for Research and Technology—Hellas (FORTH), May 8 & 10, 2014, available at http://www.csd.uoc.gr/~hy428/reading/vmio_may8_2014.pdf, retrieved Dec. 21, 2015, 78 pages.

* cited by examiner

INPUT/OUTPUT METHOD IN VIRTUAL MACHINE ENVIRONMENTS

This application claims priority under 35 U.S.C. § 119 to Korean Patent Application No. 10-2014-0185988, filed Dec. 22, 2014, in the Korean Intellectual Property Office, the entire content of which is incorporated herein by reference in its entirety.

BACKGROUND

The present disclosure relates to an input/output method in a virtual machine environment.

An input/output (I/O) operation generated by a guest operating system (OS), which is driven by a virtual machine (VM), may be sent to a host OS in an interrupt manner, and the host OS may perform the input/output operation using various input/output devices. When the VM emulates an input/output event generated by the guest OS in an interrupt manner and sends the input/output event to the host OS, it can increase overhead due to context switching and result in resource waste and performance degradation of a computing device in which this virtual environment has been established. To overcome these and other shortcomings, it may be beneficial to provide an improved input/output processing method for the guest OS and the VM in a high-speed storage environment (e.g., a solid state drive (SSD) environment) that requires low latency.

SUMMARY

In one exemplary embodiment, the present disclosure is directed to a method, comprising: performing, by a virtual machine (VM) executing on a computing device, request polling (RP) to detect an input/output event generated by a first operating system (OS), wherein the first OS is driven by the VM; sending, by the VM, an input/output request message to a second OS when the input/output event is detected through the RP, wherein the VM is executed on the second OS; performing, by the VM, response waiting polling (IMP) to detect an input/output completion event generated by the second OS; and sending, by the VM, an input/output response message to the first OS when the input/output completion event is detected through the RWP, wherein the RP and the WP are performed by multiple threads executed on the VM.

In another exemplary embodiment, the present disclosure is directed to a method, comprising: receiving, by a virtual machine (VM) executing on a computing device, an input/output event notification generated by a first OS using a request polling (RP) thread that is executed on the VM, wherein the first OS is driven by the VM; sending, by the VM to a second OS, an input/output request message that is based on the input/output event notification, wherein the VM is executed on the second OS; receiving, by the VM, an input/output completion event notification generated by the second OS using a request waiting polling (RWP) thread that is executed on the VM; and sending, by the VM to the first OS, an input/output response notification in response to a completion polling (CP) thread that is executed on the first OS, wherein the input/output response notification is based on the input/output completion message.

In another exemplary embodiment, the present disclosure is directed to a method, comprising: polling, by a virtual machine (VM) executing on a computing device, a first operating system (OS) to detect an input/output event generated by the first OS, wherein the first OS is driven by the VM, sending, when the input/output event is detected by the VM, an input/output request message to a second OS, wherein the VM is executed on the second OS, polling, by the VM, the second OS to detect an input/output completion event generated by the second OS; generating, by the VM, an input/output completion notification based on the input/output completion event; and sending, to the first OS, the input/output completion notification.

BRIEF DESCRIPTION OF THE DRAWINGS

The above and other aspects and features of the present disclosure will become more apparent by describing in detail exemplary embodiments thereof with reference to the attached drawings, in which.

DETAILED DESCRIPTION

Figure 1:
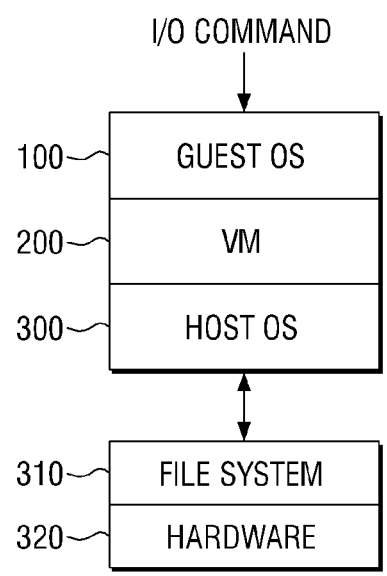
FIG. 1 is a schematic diagram of an example computing device performing input/output methods, according to certain disclosed embodiments.

Embodiments will be described in detail with reference to the accompanying drawings. The inventive concept and features, however, may be embodied in various different forms, and should not be construed as being limited only to the illustrated embodiments. Accordingly, known processes, elements, and techniques are not described with respect to some of the disclosed embodiments. Unless otherwise noted, like reference numerals denote like elements throughout the attached drawings and written description, and thus descriptions will not be repeated. In the drawings, the sizes and relative sizes of layers and regions may he exaggerated for clarity.

It will be understood that, although the terms "first", "second", "third", etc., may be used herein to describe various elements, components, regions, layers and/or sections, these elements, components, regions, layers and/or sections should not be limited by these terms. Unless indicated otherwise, these terms are only used to distinguish one element, component, region, layer or section from another element, component, region, layer or section. Thus, a first element, component, region, layer or section discussed below could be termed a second element, component, region, layer or section without departing from the teachings of the disclosure.

Spatially relative terms, such as "beneath", "below", "lower", "under", "above", "upper" and the like, may be used herein for ease of description to describe one element or feature's relationship to another element(s) or feature(s) as illustrated in the figures. It will he understood that the spatially relative terms are intended to encompass different orientations of the device in use or operation in addition to the orientation depicted in the figures. For example, if the device in the figures is turned over, elements described as "below" or "beneath" "or under" other elements or features would then be oriented "above" the other elements or features. Thus, the exemplary terms "below" and "under" can encompass both an orientation of above and below. The device may be otherwise oriented (rotated 90 degrees or at other orientations) and the spatially relative descriptors used herein interpreted accordingly. In addition, it will also be understood that when a layer is referred to as being "between" two layers, it can be the only layer between the two layers, or one or more intervening layers may also be present.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Also, the term "exemplary" is intended to refer to an example or illustration.

It will be understood that when an element or layer is referred to as being "on", "connected to", "coupled to", or "adjacent to" another element or layer, it can be directly on, connected, coupled, or adjacent to the other element or layer, or intervening elements or layers may be present. In contrast, when an element is referred to as being "directly on," "directly connected to", "directly coupled to", or "immediately adjacent to" another element or layer, there are no intervening elements or layers present.

Unless otherwise defined, all terms (including technical and scientific terms) used herein have the same meaning as commonly understood by one of ordinary skill in the art. It will be further understood that terms, such as those defined in commonly used dictionaries, should be interpreted as having a meaning that is consistent with their meaning in the context of the relevant art and/or the present specification and will not be interpreted in an idealized or overly formal sense unless expressly so defined herein.

FIG. 1 is a schematic diagram of an example computing device 1 performing input/output methods according to various embodiments. A computing device, such as computing device 1, may include, for example, one or more of: stationary and/or portable computers, whether having single processors, multiple processors, or multi-core processors; workstations; mainframes; servers; clients; television; stationary or portable telephones or telecommunications devices; personal digital assistants (PDA); tablet computers; scanners; pagers; cameras; musical devices; etc.

Referring to FIG. 1. the computing device 1 may perform the input/output methods according to various embodiments in a virtual machine (VM) environment. The computing device 1 may include a guest operating system (OS) 100, a VM 200, and a host OS 300. The computing device 1 may further include a file system 310 and hardware 320. For example, a computing device, such as computing device 1, may include one or more of the following: central processing unit (CPU) configured to execute computer program instructions to perform various processes and methods consistent with certain disclosed embodiments; random access memory (RAM) and/or read only memory (ROM) configured to access and store information and computer program instructions associated with the disclosed embodiments; memory or other storage devices to store data and information; databases to store tables, lists, or other data structures; input/output (I/O) devices; interfaces; antennas; etc.

The guest OS 100 may be an OS installed on a VM and driven by the VM. In certain embodiments, the guest OS 100 may be different from the host OS 300. For example, the guest OS 100 may be an OS having a different platform from the host OS 300, an OS incompatible with the host OS 300, or an OS incapable of directly controlling the hardware 320 that is controlled by the host OS 300.

In some embodiments, for example, the guest OS 100 may be an OS such as OS X® of Apple Inc., WINDOWS® of Microsoft Corporation, UNIX®, LINUX®, or a mobile specific OS, such as, for example, ANDROID™ of Google. However, the guest OS 100 is not limited to these examples. In some embodiments, the guest OS 100 may be not only an OS but also a specific application, program or process that can be executed on a VM.

In certain embodiments, the VM 200 operates in the host OS 300 and implements a computing device or environment as software that emulates a computing device or environment. For example, the VM 200 provides to the guest OS 100 an environment in which it executes. In some embodiments, the VM 200 may provide a complete execution environment of an OS (i.e., the guest OS 100) by supporting emulation of the entire computing device. In some other embodiments, the VM 200 may support emulation for executing a specific application, program or process.

In some embodiments, the VM 200 may be, but is not limited to, a kernel-based virtual machine (KVM). The VM 200 may be implemented in the computing device or environment at one or more levels such as an application level, a kernel level, etc.

The host OS 300 may be an OS that directly controls the computing device or environment. For example, the host OS 300 may directly control the file system 310, the hardware 320, etc. of the computing device or environment. For example, as illustrated in FIG. 1, when the Quest OS 100 receives an input/output command from a user or a specific application, program or process, the VM 200 may send to the host OS 300 an input/output request message for processing an input/output operation in response to the received input/output command. The host OS 300, in turn, may receive the input/output request message from the VM 200, and perform the input/output operation by directly controlling components of the computing device 1, e.g., the file system 310, the hardware 320, etc.

In some embodiments, for example, the host OS 300 may be an OS such as OS X® of Apple Inc., WINDOWS® of Microsoft Corporation, UNIX®, LINUX®, or a mobile specific OS such as ANDROID™ of Google, However, the host OS 300 is not limited to these examples.

Figure 2:
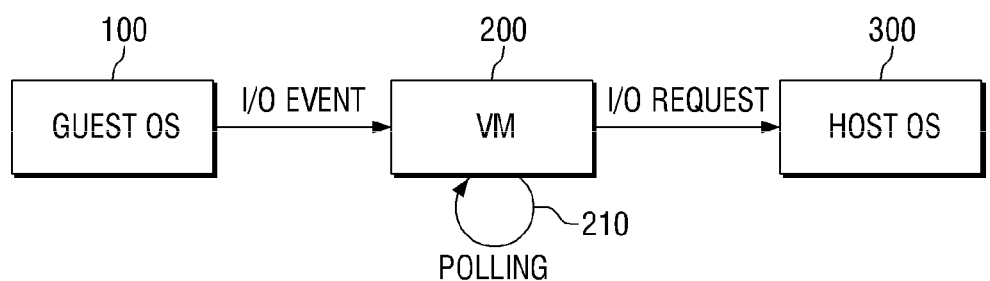
FIGS. 2 and 3 are schematic diagrams illustrating example input/output methods, according to certain disclosed embodiments.
Figure 3:
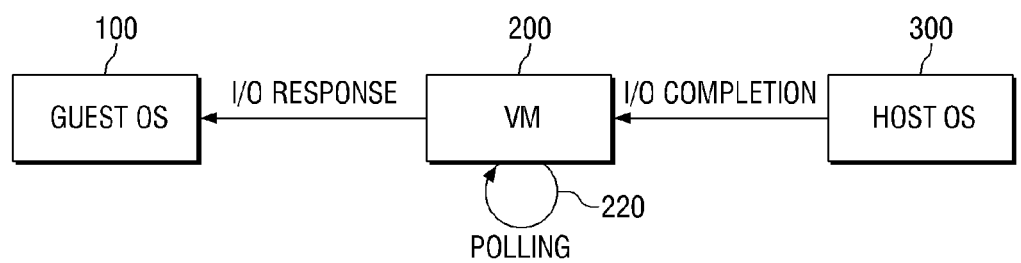

FIGS. 2 and 3 are schematic diagrams illustrating an example input/output method, according to certain embodiments.

Referring to FIG. 2, the input/output method according to some embodiments may include performing request polling (RP) 210 on an input/output event received from the guest OS 100. The input/output event may be a status Change and/or notification that is generated by OS 100 and detected or received by RP 210. In certain embodiments, polling may include processes in which a first process or device waits on another process or device to check for its readiness or state. For example, polling may include sending a polling message from a second process or device to a first process or device. In response to the polling message, the first process or device may send a response or message to the second process or device that is responsive to the polling message. In one embodiment, for example, guest OS 100 may receive an input/output command for storing data in a memory or other storage device from a user or a specific application, program or process. The guest OS 100 may, in turn, generate an input/output event for storing the data in the memory or storage device. The VM 200 may perform the RP 210 to periodically or continuously Check whether the input/output event has been generated by the guest OS 100. In performing the RP 210, the VM 200 may detect the input/output event generated by the guest OS 100. For example, the generated input/output event may be delivered or transmitted to the VM 200 not in an interrupt manner but in a polling manner. In some embodiments, the RP 210 may be performed by one or more of the multiple threads that may be executed on the VM 200. Generally, a thread may be the smallest sequence of programmed instructions that is managed by the OS, and may include a component of a process. Threads may share resources, such as, for example, memory, instructions (executable code), and context (variable values). In some embodiments, multiple threads may exist in the same process, and execute concurrently, such that one thread starts before another thread finishes but at least part of both threads execute at the same time.

When the input/output event is detected by the VM 200 through the RP 210, the VM 200 may generate and transmit an input/output request message to the host OS 300. For example, when VM 200 detects an input/output event for storing the data in a memory or storage device by using the RP 210, the VM 200 may send an input/output request message to the host OS 300, requesting that host OS 300 store the data in the memory or storage device.

Referring to FIG. 3, in some embodiments, the input/output method may include performing a response waiting polling (RWP) 220 on an input/output completion event generated by the host OS 300 ("response waiting polling," or RWP may be referred to herein in certain instances as "response waiting" or "RW"). The input/output completion event may be a status change and/or notification that is generated by host OS 300 and detected or received by RWP 220. As one example, when the host OS 300 receives the input/output request message for storing the data in a memory or storage device from the VM 200, the host OS 300 may store the data in the memory or storage device and generate an input/output completion event to inform of the completion of a data storage operation. The VM 200 may perform the RWP 220 periodically or continuously to check whether the input/output completion event has been generated by the host OS 300. In performing the RWP 220, the VM 200 may detect the input/output completion event generated by the host OS 300. For example, the generated input/output completion event is delivered or transmitted to the VM 200 not in an interrupt manner but in a polling manner. In some embodiments, the RWP 220 may be performed by some other ones (not the threads performing the RP 210) of the multiple threads that may be executed on the VM 200.

When the input/output completion event is detected by the VM 200 through the RWP 220, the VM 200 may generate and send an input/output response message to the guest OS 100. For example, when VM 200 detects the input/output completion event that informs of the completion of the data storage operation using the RWP 220, the VM 200 may send an input/output response message to the guest OS 100 to notify a user or a specific application, program or process of the completion of an input/output operation and the result of the input/output operation. In some embodiments, to notify a user or a specific application, program or process, the guest OS 100 may, for example, generate message (audio, visual, etc) for output on an interface device (e.g., display unit, printer, speakers, lights, etc.); prepare and transmit notification messages to other applications, programs or processes; change a status associated with the guess OS 100 and/or applications, programs or processes; etc.

In some embodiments, the RP 210 and the RWP 220 may be performed or executed sequentially, concurrently, or in parallel. In some embodiments, one or more threads performing the RWP 220 may be executed in parallel with one or more threads performing the RP 210. In some embodiments, when threads are executing in parallel, they may be executing at the same instant; when threads are executing concurrently, they may he executing such that one thread starts before another thread ends; and when threads are executing sequentially, they may be executing without any overlap in their respective executions.

Figure 4:
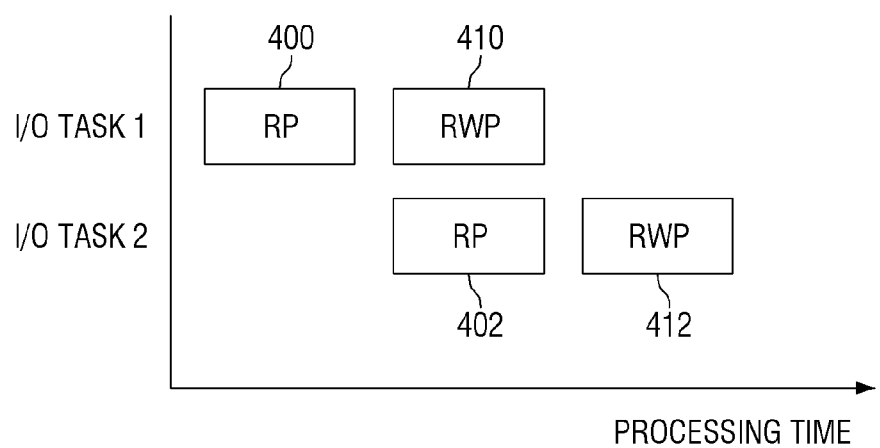
FIG. 4 is a schematic diagram illustrating an example process in which the input/output method that is processed in a pipeline manner, according to certain disclosed embodiments.

FIG. 4 is a schematic diagram illustrating an example input/output method that is processed in a pipeline manner, consistent with certain disclosed embodiments. For example, when the input/output method is performed in a pipeline manner, the output of one element may be the input to the next element in a chain of processing elements (e.g., processes, threads, functions, etc.).

As illustrated in the example of FIG. 4, in some embodiments, when the guest OS 100 sequentially receives two input/output commands from a user or a specific application, program or process, two input/output tasks respectively corresponding to the two input/output commands may be processed over time.

Specifically, FIG. 4 illustrates an embodiment in which the guest OS 100 sequentially receives a first input/output command and a second input/output command from a user or a specific application, program or process. In this example embodiment, the VM 200 may perform request polling (RP) 400 and a request waiting polling (RWP) 410 on a first input/output task in response to the first input/output command. Likewise, the VM 200 may perform RP 402 and RWP 412 on a second input/output task in response to the second input/output command. In certain embodiments, RP 400 and RP 402 may be substantially similar to the embodiments of RP 210, as disclosed and described above. Likewise, in certain embodiments, RWP 410 and RWP 412 may be substantially similar to the embodiments of RWP 220, as disclosed and described above.

In some embodiments, the RP 400, the RWP 410, the RP 402, and the RWP 412 may be performed in a pipeline manner as illustrated in FIG. 4. As one example, in some embodiments, the RWP 410 on the first input/output task and the RP 402 on the second input/output task may be performed in parallel, while the RP 400 and the RWP 410 of the first input/output task and the RP 402 and the RWP 412 of the second input/output task, respectively, may be performed sequentially. In some embodiments, one or more of the RP 400, the RWP 410, the RP 402, and the RWP 412 may be performed in any combination of parallel, serial, or concurrently with one another. For example, in some embodiments, the RP 400 and the RWP 410 of the first input/output task may be performed in parallel or concurrently with one another, and the RP 402 and the RWP 412 of the second input/output task may be performed in parallel or concurrently with one another. In another example, all of the RP 400 and the RWP 410 of the first input/output task and the RP 402 and the RWP 412 of the second input/output task may be performed in parallel, concurrently, or serially with one another.

In some embodiments, the threads executing or performing the RP 400, the RWP 410, the RP 402, and the RWP 412 may be reusable. For example, the RP 400 of the first input/output event may be performed by a first thread. When an input/output event generated by the guest OS 100 is detected through the RP 400, the VM 200 may send an input/output request to the host OS 300 using the first thread and then generate a second thread for performing the RP 402. After the generation of the second thread, the RWP 410 may be performed by the first thread.

As another example embodiment, the RWP 410 may be performed by a third thread. When an input/output completion event generated by the host OS 300 is detected through the RWP 410, the VM 200 may send an input/output response message to the guest OS 100 using the third thread and then generate a fourth thread for performing the RWP 412. Here, the RIP following the generation of the fourth thread (not illustrated) may be performed by the third thread.

Figure 5:
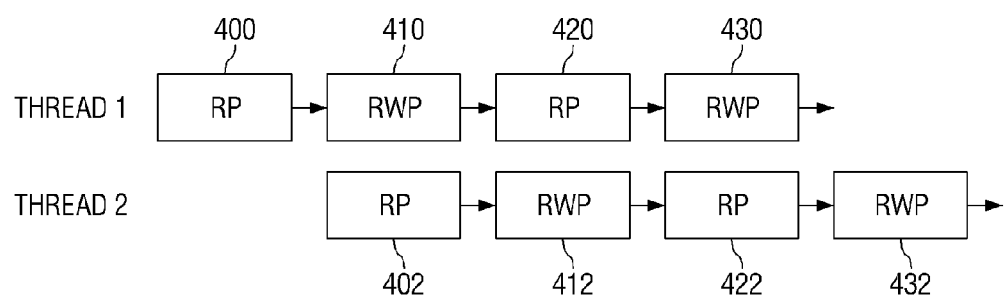
FIG. 5 is a schematic diagram illustrating an example process in which the input/output method that is processed by multiple threads, according to certain disclosed embodiments.

FIG. 5 is a schematic diagram illustrating an example process in which the input/output method that is processed by multiple threads, consistent with certain disclosed embodiments.

Referring to FIG. 5, the input/output method according to one example embodiment may include sending an input/output event notification corresponding to an input/output event generated by the guest OS 100 to the VM 200 using the first thread (the RP 400) executed on the VM 200, and sending an input/output request message to the host OS 300 based on the input/output event or input/output event notification. In addition, the input/output method may include sending a second input/output event notification corresponding to an input/output event generated by the guest OS 100 to the VM 200 using the second thread (the RP 402), and sending an input/output request message to the host OS 300 based on the second input/output event or input/output event notification.

During the RP 402 performed by the second thread, the first thread may send an input/output completion notification corresponding to an input/output completion event generated by the host OS 300 to the VM 200 (the RP 410). In this way, the input/output method according to the current embodiment may be performed in a pipeline polling manner using multiple threads.

Figure 6:
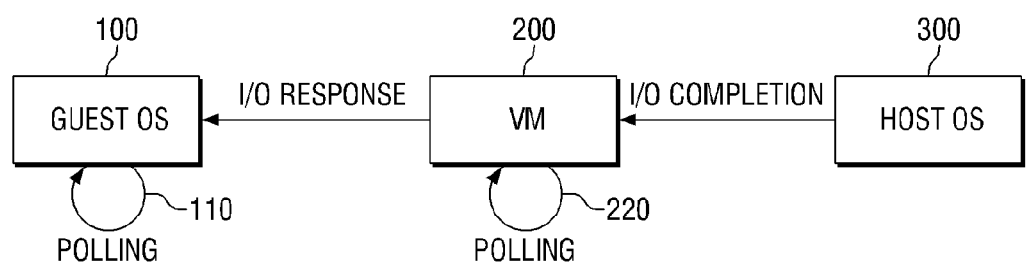
FIG. 6 is a schematic diagram illustrating an example input/output method, according to certain disclosed embodiments.

FIG. 6 is a schematic diagram illustrating an example input/output method according to another embodiment.

Referring to FIG. 6, the input/output method according to one example embodiment may include sending an input/output response message to a thread which is executed on the guest OS 100 and performing completion polling (CP) 110. For example, the VM 200 may receive an input/output completion notification that informs of the completion of a data storage operation from the host OS 300, and the VM 200 may send an input/output response event or input/output response notification to the guest OS 100. The guest OS 100 may perform the CP 110 for periodically or continuously checking whether the input/output response event or input/output response notification has been generated by the VM 200. In performing the CP 110, the guest OS 100 may detect the input/output response event or input/output response notification generated by the VM 200. For example, the generated input/output response notification is delivered to the guest OS 100 not in an interrupt manner but in a polling manner.

Referring to FIGS. 2 and 6, in some embodiments, at least two of RP 210, RWP 220 and the CP 110 may be performed sequentially, concurrently, or in parallel. Again referring to FIGS. 2 and 6, in some embodiments, the RP 210, the RWP 220 and the CP 110 may be performed in a pipeline manner.

Figure 7:
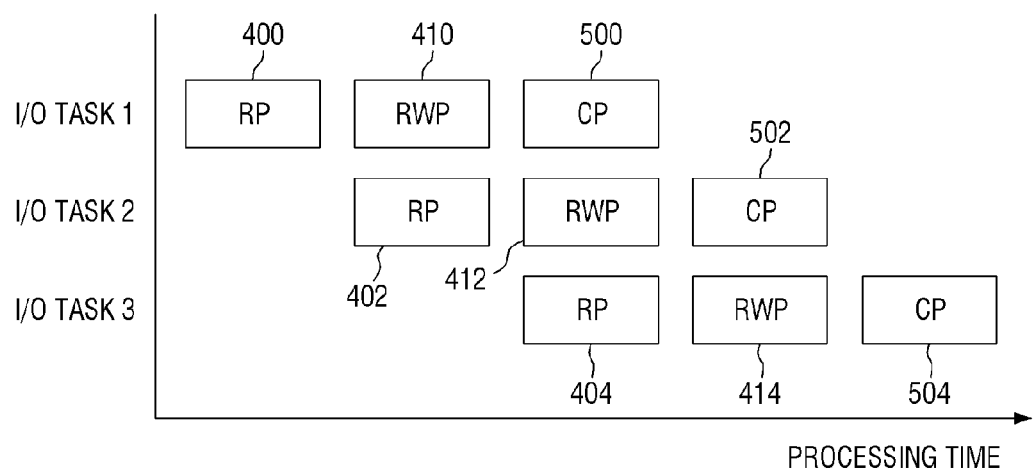
FIG. 7 is a schematic diagram illustrating an example process in which the input/output method that is processed in a pipeline manner, according to certain disclosed embodiments.

FIG. 7 is a schematic diagram illustrating an example process in which the input/output method according to another embodiment is processed in a pipeline manner.

As illustrated in the example of FIG. 7, in some embodiments, when the guest OS 100 sequentially receives three input/output commands or messages from a user or a specific application, program or process, three input/output tasks respectively corresponding to the three input/output commands or messages are processed over time.

Specifically, FIG. 7 illustrates an embodiment in which the guest OS 100 sequentially receives a first input/output command or message, a second input/output command or message, and a third input/output command or message from a user or a specific application, program or process. In this example embodiment, the VM 200 may perform the RP 400, the RWP 410, and the CP 500 on a first input/output task in response to the first input/output command or message, Likewise, the VM 200 may perform the RP 402, the RWP 412, and the CP 502 on a second input/output task in response to the second input/output command or message. In addition, the VM 200 may perform the RP 404, the RWP 414, and the CP 504 on a third input/output task in response to the third input/output command or message. As a result, in some embodiments, all three input/output tasks can be performed serially, concurrently or in parallel.

In some embodiments, the RP 400, the RWP 410, the CP 500, the RP 402, the RWP 412, the CP 502, the RP 404, the RWP 414 and the CP 504 may be performed in a pipeline manner as illustrated in FIG. 7. As one example, in sonic embodiments, the CP 500 on the first input/output task, the RWP 412 on the second input/output task, and the RP 404 on the third input/output task may be performed in parallel and/or concurrently, the RP 402 of the first input/output task and the RWP 410 of the second input/output task may be performed in parallel and/or concurrently, the CP 502 of the second input/output task and the RWP 414 of the third input/output task may be performed in parallel and/or concurrently, while the RP 400 of the first input/output task and the CP 504 of the third input/output task may be performed sequentially.

Figure 8:
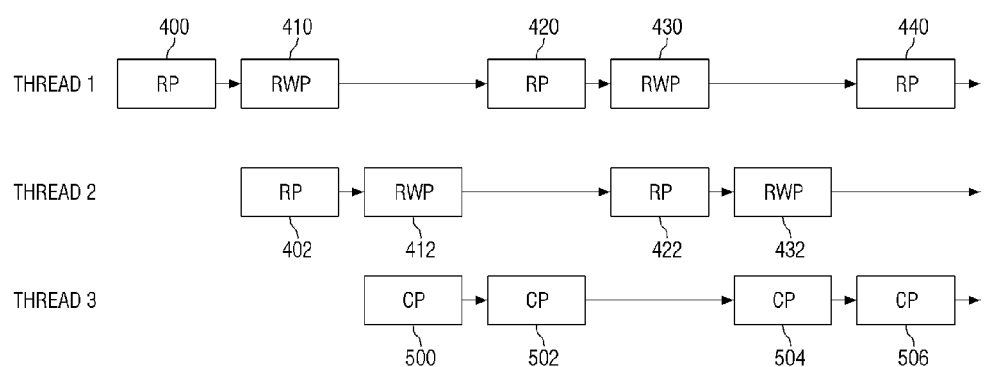
FIG. 8 is a schematic diagram illustrating an example process in which the input/output method that is processed by multiple threads, according to certain disclosed embodiments.

FIG. 8 is a schematic diagram illustrating an example input/output method that is processed by multiple threads, consistent with certain disclosed embodiments.

Referring to FIG. 8, the input/output method according to some embodiments may include sending a first input/output event generated by the guest OS 100 to the VM 200 using a first thread (the RP 400) executed on the VM 200, and sending a first input/output request message to the host OS 300 based on the first input/output event. In addition, the input/output method illustrated in FIG. 8 may include sending a second input/output event generated by the guest OS 100 to the VM 200 using a second thread (the RP 402), and sending a second input/output request message to the host OS 300 based on the second input/output event. The first and second input/output events may be status changes and/or notifications that are generated by the guest OS 100 and detected or received, respectively, by the RP 400 and the RP 402.

While the second thread is performing the RWP 412, a third thread may send an input/output response event generated by the VM 200 to the guest OS 100 (the CP 500).

The input/output response event may be a status change and/or notification that is generated by the VM 200 and detected or received by the CP 500. In this way, the input/output method according to some embodiments may be performed in a pipeline polling manner using multiple threads.

Figure 9:
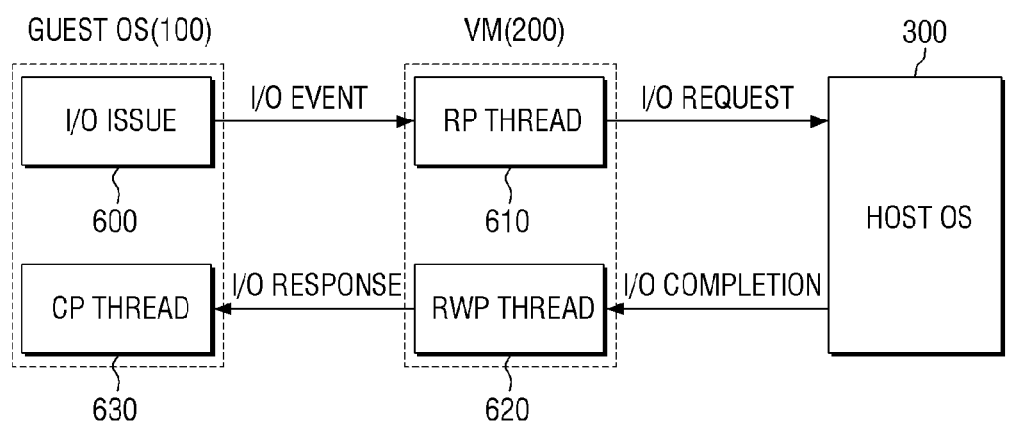
FIG. 9 is a schematic diagram illustrating an example input/output method, according to certain disclosed embodiments.

FIG. 9 is a schematic diagram illustrating an example input/output method according to certain embodiments.

Referring to FIG. 9, the input/output method may include sending an input/output event generated by the guest OS 100, which is driven by the VM 200, to the VM 200 using an RP thread 610 executed on the VM 200. The input/output event may be a status change and/or notification that is generated by OS 100 and detected or received by, for example, RP 610. In the disclosed embodiment, the input/output event or notification is generated on guest OS 100 by input/output issue 600. The example embodiment may further include sending an input/output request message to the host OS 300, on which the VM 200 is executed, based on the input/output event. In addition, the input/output method of this example embodiment may include sending an input/output completion event generated by the host OS 300 to the VM 200 using an RWP thread 620 executed on the VM 200. The input/output completion event may be a status change and/or notification that is generated by the host OS 300 and detected or received by RWP 620. In addition, the input/output method may include sending an input/output response event to the guest OS 100 using a CP thread 630 executed on the guest OS 100 based on the input/output completion event. The input/output response event may be a status change and/or notification that is generated by the VM 200 and detected or received by the guest OS 100.

In some embodiments, at least two of the RP thread 610, the RWP thread 620, and the CP thread 630 may be executed serially, concurrently, and/or in parallel. And, in some embodiments, the RP 610, the RWP 620, and the CP 630 may be performed in a pipeline manner by the RP thread 610, the RWP thread 620, and the CP thread 630, respectively.

Figure 10:
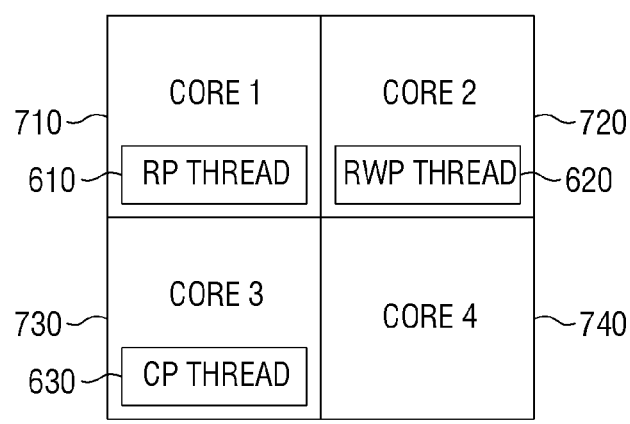
FIG. 10 is a schematic diagram illustrating an example input/output method, according to certain disclosed embodiments.

FIG. 10 is a schematic diagram illustrating an example input/output method according to another embodiment. FIG. 10 illustrates a multi-core processor that may be, for example, a single component (e.g., a single physical package or single semi-conductor module) having two or more computer processing units, which are each referred to as "cores." Each processing unit may be for example, a semi-conductor chip. Each core may be configured to execute computer instructions, such that the multiple cores may be able to run multiple instructions at the same time.

Referring to FIG. 10, a computing device, such as computing device 1, on which the host OS 300 runs may include multiple cores 700, and the multiple cores 700 may include a first core 710, a second core 720, a third core 730, and a fourth core 740. The RP thread 610, the RWP thread 620, and the CP thread 630 described above with reference to FIG. 9 may be executed on for example, the first core, 710, the second core 720, and the third core 730, respectively.

Figure 11:
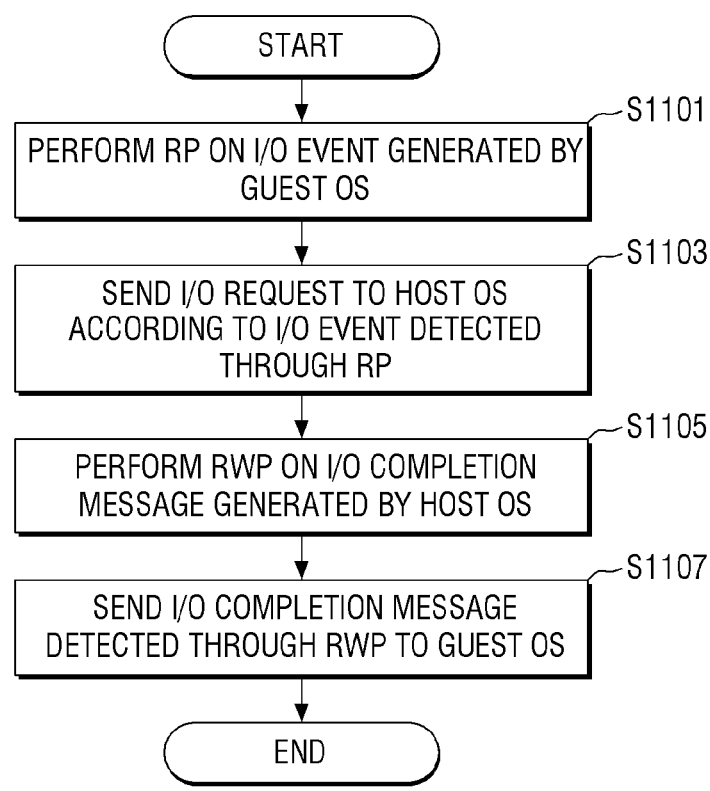
FIG. 11 is a flowchart illustrating an example input/output method, according to certain disclosed embodiments.

FIG. 11 is a flowchart illustrating an example input/output method according to certain embodiments.

Referring to FIG. 11, the example input/output method according to one embodiment may include performing RP 210 to detect an input/output event generated by the guest OS 100 using a first thread (operation S1101), and sending an input/output request message to the host OS 300 based on the input/output event detected through the RP 210 (operation S1103). The input/output event may be a status change and/or notification that is generated by the guest OS 100 and detected or received by the RP 210. In addition, the input/output method may include performing RWP 220 to detect an input/output completion event generated by the host OS 300 using the first thread (operation S1105), and sending to the guest OS 100 an the input/output completion message corresponding to the input/output completion notification detected through the RWP 220 (operation S1107). The input/output event may be a status change and/or notification that is generated by the host OS 300 and detected or received by RWP 220.

In some embodiments, performing the RWP 220 may include performing the RP 210 in parallel or concurrently with the RWP 220, such that the RWP 220 is performed using the first thread and RP 210 is performed using a second thread that is different from the first thread. In some embodiments, sending the input/output completion message corresponding to the input/output completion event detected through the RWP 220 to the attest OS 100 may include sending an input/output response message to the guest OS 100 based on the input/output completion event detected through the RWP 220.

Figure 12:
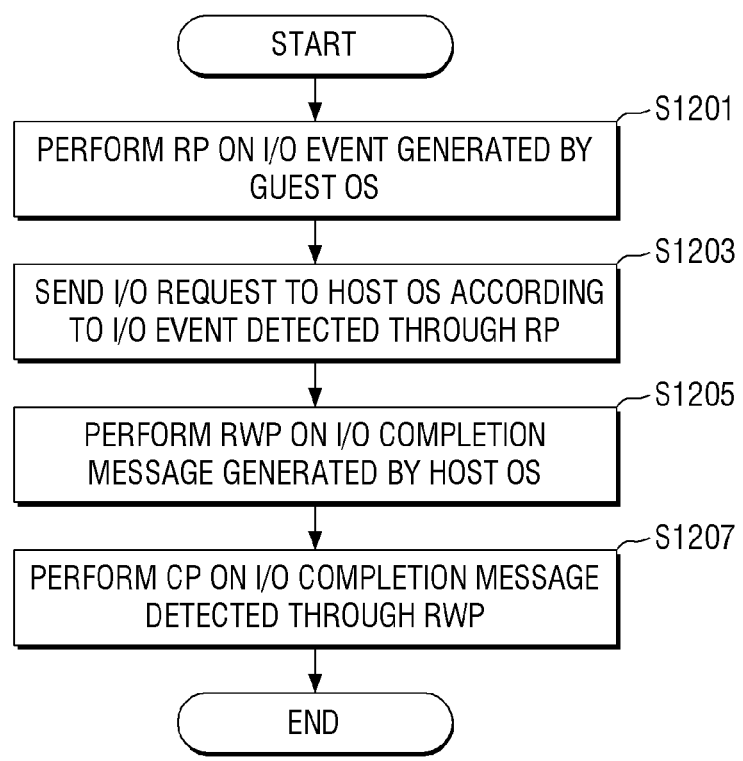
FIG. 12 is a flowchart illustrating an example input/output method, according to certain disclosed embodiments.

FIG. 12 is a flowchart illustrating an example input/output method according to another embodiment.

Referring to FIG. 12, in some embodiments, the input/output method may include performing RP 210 to detect an input/output event generated by the guest OS 100 using a first thread (operation S1201), and sending an input/output request message to the host OS 300 based on the input/output event detected through the RP 210 (operation S1203). The input/output event may be a status change and/or notification that is generated by the guest OS 100 and detected or received by the RP 210. In addition, the input/output method may include performing RWP 220 to detect an input/output completion event generated by the host OS 300 using a second thread (operation S1205). The input/output completion event may be a status change and/or notification that is generated by the host OS 300 and detected or received by RWP 220. The input/output method may further include performing CP 110 to detect an input/output response event generated by the VM 200 using a third thread different from the first thread and the second thread. The input/output response event may be a status change and/or notification that is generated by the VM 200 and detected or received by the CP 110.

In some embodiments, performing the RWP 220 may include performing the RP 210 and the CP 110 in serially, concurrently, or parallel with the IMP 220 using the second thread and the third thread while performing the RWP 220 using the first thread.

According to various embodiments, a VM emulates an input/output event generated by a guest OS using a polling method and sends the input/output event to a host OS. Therefore, overhead due to context switching can be prevented. Accordingly, the disclosed embodiments may prevent resource waste and performance degradation of a computing device in which a virtual environment and a high-speed storage environment (e.g., a solid state drive (SSD) environment) that requires low latency have been established.

The disclosed embodiments have been described with reference to the attached drawings, but it may be understood by one of ordinary skill in the art that the disclosed embodiments may be performed in other forms without changing the technical concept or essential features. Further, the above-described embodiments are merely examples and are not intended to limit or otherwise restrict the scope of the claims.

What is claimed is:

1. A method comprising:
    performing, by a virtual machine (VM) executing on a computing device, request polling (RP) to detect an input/output event generated by a first operating system (OS), wherein the first OS is driven by the VM;
    sending, by the VM, an input/output request message to a second OS when the input/output event is detected through the RP, wherein the VM is executed on the second OS;
    performing, by the VM, response waiting polling (RWP) to detect an input/output completion event generated by the second OS; and
    sending, by the VM, an input/output response message to the first OS when the input/output completion event is detected through the RWP, wherein the RP and the RWP are performed by multiple threads executed on the VM,
    wherein the sending the input/output request message to the second OS further comprises:
        sending the input/output request message to the second OS using a first thread of the multiple threads, and
        generating a second thread for performing a second RP after sending the input/output request message to the second OS using the first thread, and
    wherein the performing the RP and the performing the RWP further comprise performing the RP in a pipeline manner with the performing the RWP.

2. The method of claim 1, further comprising:
    performing the RP by the first thread of the multiple threads; and
    performing the RWP by the second thread of the multiple threads, wherein the first thread and the second thread are different.

3. The method of claim 2, wherein the performing the RWP by the second thread further comprises:
    performing the RWP by the second thread in parallel with the performing the RP by the first thread.

4. The method of claim 2, wherein the computing device comprises multiple cores, and further wherein:
    the performing the RP by the first thread comprises executing the RP on a first one or more of the multiple cores; and
    the performing the RWP by the second thread comprises executing the RWP on a second one or more of the multiple cores, wherein the first one or more of the multiple cores is different than the second one or more of the multiple cores.

5. The method of claim 1, wherein the performing the RWP further comprises:
    performing the RWP by the first thread after the generating the second thread.

6. The method of claim 1, wherein the performing the RWP further comprises:
    performing the RWP by a third thread;
    sending the input/output response message to the first OS using the third thread; and
    generating a fourth thread after sending the input/output response message to the first OS using the third thread.

7. The method of claim 6, further comprising:
    performing, after the generating the fourth thread, a second RP by the third thread.

8. The method of claim 1, wherein the sending the input/output response message to the first OS further comprises:
    performing, by a thread executing on the first OS, completion polling (CP); and
    sending, by the VM, the input/output response message to the thread executing on the first OS.

9. The method of claim 8, further comprising:
    performing at least two of the RP, the RWP, and the CP concurrently.

10. The method of claim 8, further comprising:
    performing the RP, the RWP, and the CP in a pipeline manner.

11. The method of claim 8, wherein the computing device comprises multiple cores, and further wherein:
    the performing the RP comprises executing the RP on a first core of the multiple cores;
    the performing the RWP comprises executing the RWP on a second core of the multiple cores; and
    the performing the CP comprises executing the CP on a third core of the multiple cores.

12. A method comprising:
    receiving, by a virtual machine (VM) executing on a computing device, an input/output event notification generated by a first OS using a request polling (RP) thread that is executed on the VM, wherein the first OS is driven by the VM;
    sending, by the VM to a second OS, an input/output request message that is based on the input/output event notification, wherein the VM is executed on the second OS;
    receiving, by the VM, an input/output completion event notification generated by the second OS using a request waiting polling (RWP) thread that is executed on the VM; and
    sending, by the VM to the first OS, an input/output response notification in response to a completion polling (CP) thread that is executed on the first OS, wherein the input/output response notification is based on the input/output completion event notification,
    wherein the sending the input/output request message to the second OS further comprises:
        sending the input/output request message to the second OS using a first thread, and
        generating a second thread for performing a second RP after sending the input/output request message to the second OS using the first thread.

13. The method of claim 12, wherein the computing device comprises multiple cores, and further wherein the RP thread is executed by a first core of the multiple cores.

14. The method of claim 13, wherein the computing device comprises multiple cores, and further wherein the RWP thread is executed by a second core of the multiple cores.

15. A method comprising:
polling, by a virtual machine (VM) executing on a computing device, a first operating system (OS) to detect an input/output event generated by the first OS, wherein the first OS is driven by the VM;
sending, when the input/output event is detected by the VM, an input/output request message to a second OS, wherein the VM is executed on the second OS;
polling, by the VM, the second OS to detect an input/output completion event generated by the second OS;
generating, by the VM, an input/output completion notification based on the input/output completion event; and
sending, to the first OS, the input/output completion notification,
wherein the sending the input/output completion notification further comprises:
receiving, by the VM, a completion polling message from the first OS, and
sending, in response to the completion polling message, the input/output completion notification.

16. The method of claim 15, further comprising:
receiving, in response to the polling the first OS, a first message from the first OS; and
receiving, in response to the polling the second OS, a second message from the second OS.

17. The method of claim 15, wherein the computing device comprises multiple cores, and further wherein:
polling the first OS comprises polling the first OS using a first thread executing on a first core of the multiple cores; and
polling the second OS comprises polling the first OS using a second thread executing on a second core of the multiple cores, wherein the first core is different than the second core.

* * * * *